Nov. 9, 1965                J. J. JAMES ETAL                3,216,304
                          ONE-PIECE BOLT ANCHOR
Original Filed June 2, 1961                              3 Sheets-Sheet 1
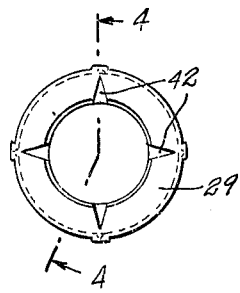
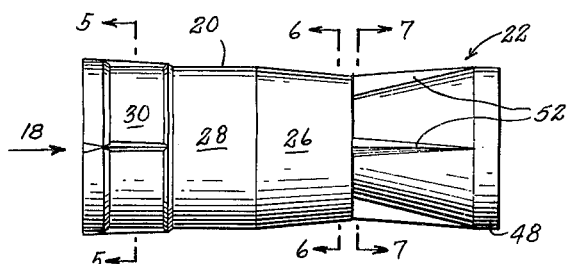
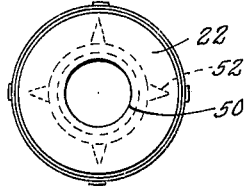
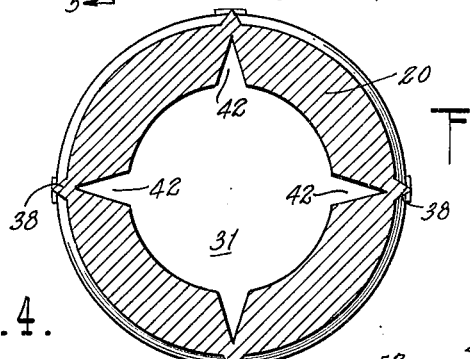
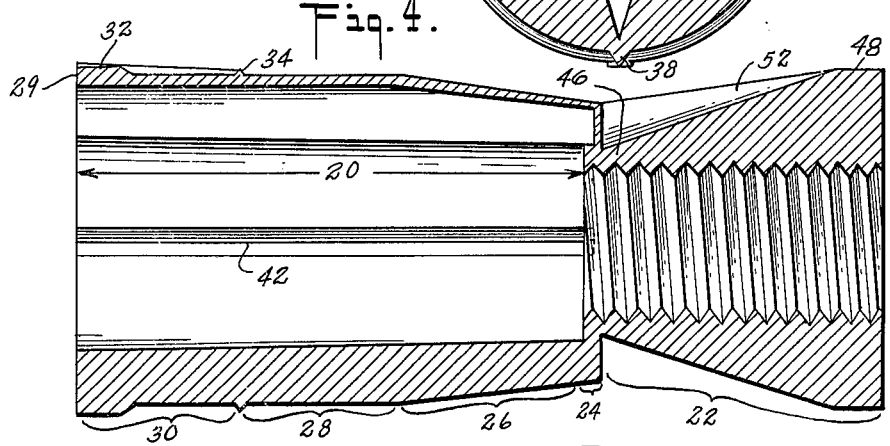
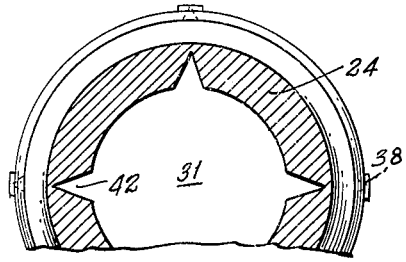
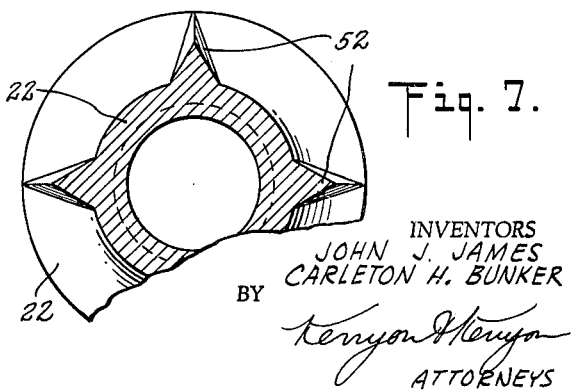
INVENTORS
JOHN J. JAMES
CARLETON H. BUNKER
BY
Kenyon & Kenyon
ATTORNEYS

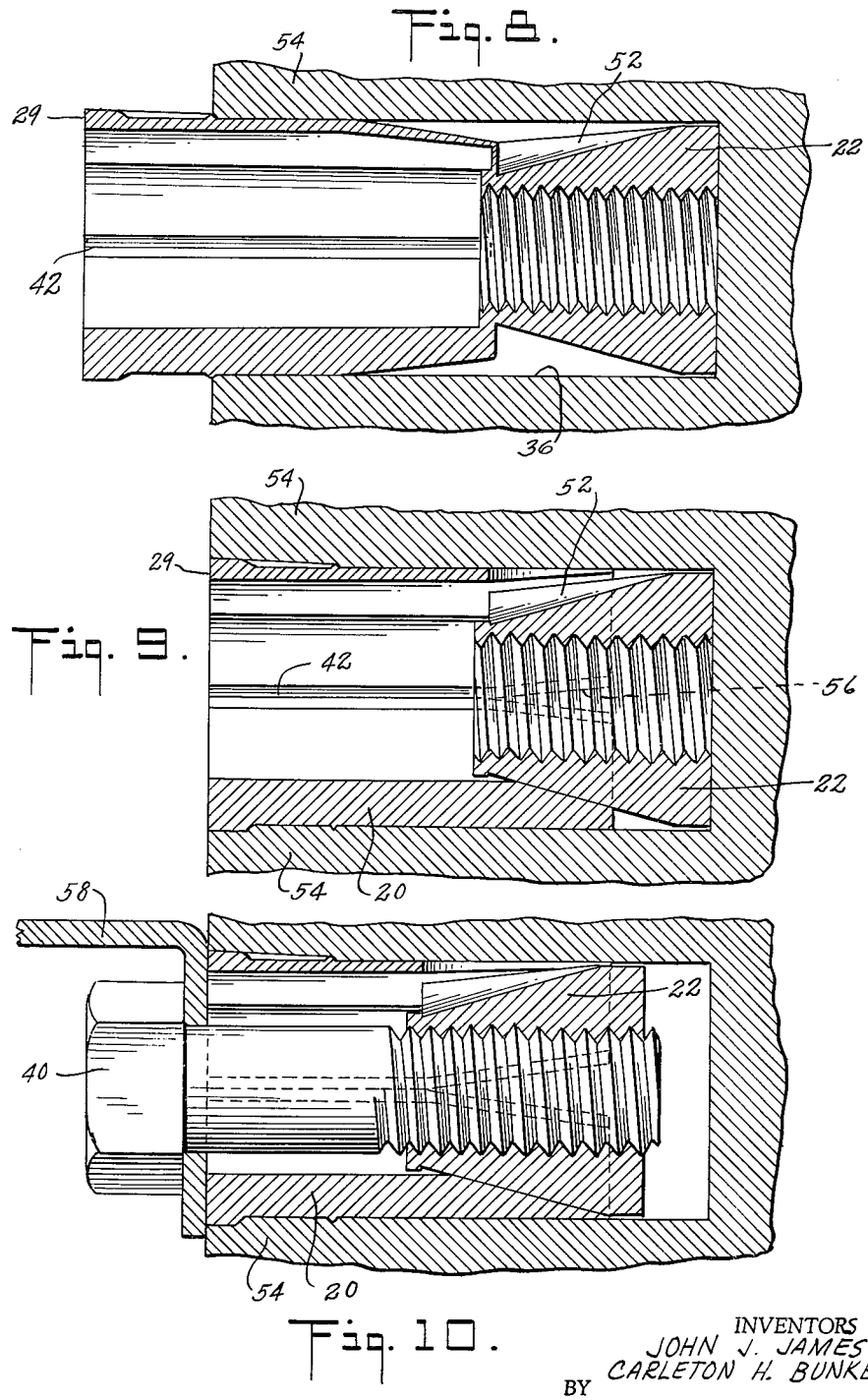

Nov. 9, 1965  J. J. JAMES ETAL  3,216,304
ONE-PIECE BOLT ANCHOR
Original Filed June 2, 1961  3 Sheets-Sheet 3
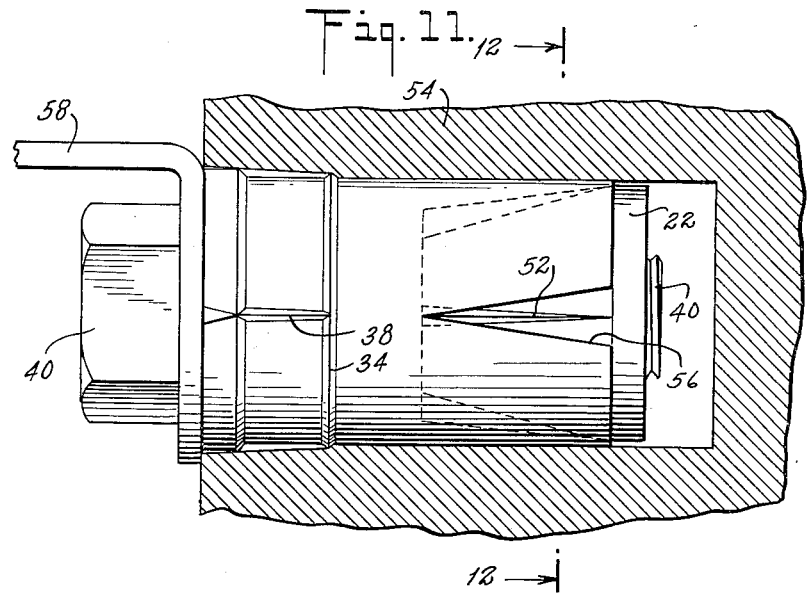
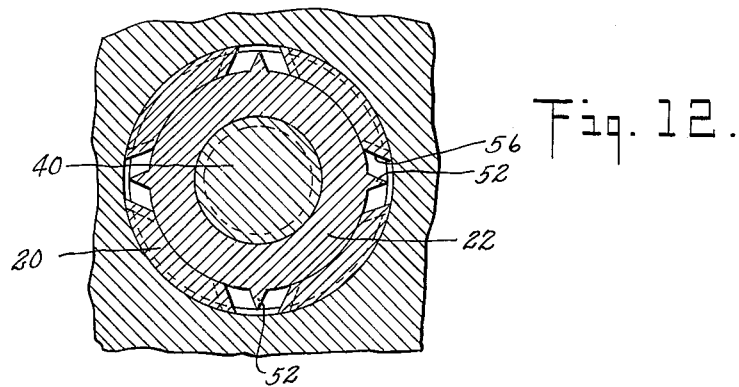
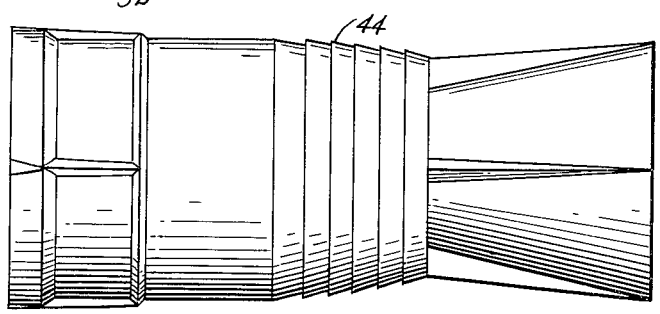
INVENTORS
JOHN J. JAMES
CARLETON H. BUNKER
BY
ATTORNEYS United States Patent Office 3,216,304
Patented Nov. 9, 1965

3,216,304
ONE-PIECE BOLT ANCHOR
John J. James, Cranford, and Carleton H. Bunker, Westfield, N.J., assignors to Diamond Expansion Bolt Co., Inc., Garwood, N.J., a corporation of New Jersey
Continuation of application Ser. No. 114,486, June 2, 1961. This application Apr. 2, 1964, Ser. No. 358,141
3 Claims. (Cl. 85—72)

This application is a continuation of United States patent application Serial No. 114,486, filed June 2, 1961, and now abandoned.

This invention relates to one piece machine bolt anchors or shields and more particularly relates to an improved one-piece machine bolt shield for use in anchoring machine bolts in masonry, hollow core structural panels, plaster, and the like.

There are presently in use many different types of anchors or shields for attaching some member to masonry, plaster, hollow core structural panels, and the like. In general, all of these operate to cause some expansion of portions of the anchor or shield into a tight fit within a previously drilled or otherwise formed hole. The expansion of the anchor or shield is brought about either by driving the anchor or shield into the hole or by means of the bolt driving one or more nut members which are wedge shaped within the shield or anchor causing the shield or anchor to expand into a tight fitting relationship with the hole.

This invention is not concerned with bolt shields or anchors which are made up from a multiplicity of parts. Rather it is concerned solely with one-piece bolt anchors or shields of the same general type illustrated and described in the Pleister U.S. Patent No. 1,808,318 and Pleister et al. U.S. Patent No. 1,852,089. The bolt anchors described in these patents have the same general configuration as does the bolt shield or anchor of this invention. However, the forms of anchors or shields illustrated and described in the patents had serious drawbacks which prevented them from ever becoming sufficiently satisfactory in use and were thus generally unsuccessful.

It is, therefore, one of the objects of this invention to provide an improved one-piece bolt shield or anchor. It is a further object to provide a bolt shield or anchor which overcomes the difficulties found to be present in prior art bolt anchors.

It is a still further object to provide a one-piece bolt anchor which is inexpensive to manufacture and performs in use much better than any such device heretofore available.

Briefly, the one-piece anchor or shield of this invention is formed of a shell portion, a tapered nut portion, and a thin continuous joining portion which joins the tapered nut portion to the shell portion. The shell portion has formed within its bore internal grooves which correspond in location to externally formed ribs on the tapered nut portion. In use, the one-piece anchor of this invention is positioned within a previously drilled hole. If the hole is in a substantially solid wall or the like, the tapered nut portion is driven into the shell portion by hitting the outer end of the shell portion with sufficient force to cause the thin continuous joining portion to rupture, thus permitting the smaller end of the tapered nut portion to enter the bore of the shell portion. The externally formed ribs on the nut portion, since they match the positions of the internal grooves formed within the shell portion, enter the grooves and cause the inner end of the shell portion to be expanded into complete and firm contact with the hole.

If, on the other hand, the hole into which the anchor of this invention is to be inserted has been drilled into a hollow wall or member such as a cinder block, the tapered nut portion is drawn into the shell portion by means of a bolt which passes through the bore of the shell portion and is threaded into the threads of the nut portion. The same action of tightening the bolt which is used to hold some member on the structure is the same action which performs the function of expanding the anchor into firm contact with the hole.

Some of the novel features of the one-piece bolt anchor of this invention can best be explained by comparing the structure of the anchor of this invention with that of the above mentioned patents. It will be noted that in both patents, the portion of the anchors which corresponds to what has been described above as the shell portion has a plurality of slots formed therethrough. The slots are described as being necessary in order to pervent the nut portion from turning during its tightening. Further, the slots act as a guide during the drawing of the nut into the bore of the shell portion. There are no such slots provided in the anchor of this invention. The slots described in the above mentioned patents create several distinct disadvantages. First, it has been found that they so weakened the structure that often in use the shell portion would break completely apart when its expansion was attempted. Secondly, masonry, in which anchors of the type described herein and in the patents above mentioned are generally employed, when drilled produce loose material which enters through the slots and interferes with the proper operation of the threaded nut portion. Another disadvantage of the slots is that in order to produce them in the sizes which are commonly used, expensive sand casting procedures had to be employed. The only other way to manufacture such devices as are shown in the patents would be to mill or otherwise cut the slots into already formed anchors. The latter operation, however, would be much too expensive, since basically the item which is described in the patents and herein must be very low in cost in order to be competitive. In the anchor of this invention internal grooves are formed in the shell portion making the device stronger and keeping its interior free from foreign matter.

Another distinct disadvantage of the anchors described and illustrated in the patents is that what is described herein as the shell portion has an internal bore which, in what is referred to here and below as the inner end section, flares or tapers outwardly. The taper is about the same taper as exists on the nut portion and, except for the ribs on the nut, very little expansion occurs until the nut is forced completely up into and beyond the flaring portion. This means that no real holding power is developed until after the nut has moved a very substantial distance.

The inner end section of the shell portion of the anchor of this invention has a substantially constant cylindrical bore. However, the inner end section is tapered from the outside toward the bore at the point where the joining portion begins, or in other words, in exactly the opposite manner to that shown in the patents. Thus, the inner end section tapers downwardly toward the joining portion so that at its smallest end it is of significantly less outside diameter than it is at the point at which the inner end section joins the body section. This makes possible the parallel expansion of the entire inner end section to ensure a firm grasping action by the anchor of this invention, which action begins almost immediately after the nut portion is separated from the shell portion.

Furthermore, this tapering inner end section permits insertion of the anchor of this invention into an inwardly tapering drilled hole much easier than was possible with the prior anchors.

The inner end section of the shell portion of the anchor of this invention may either be substantially smooth or it may have serrations or annular teeth formed thereon. This latter form permits the anchor to dig into rough or uneven sections of a drilled hole. However, a substantially smooth outer surface for the inner end section is preferred since greater friction results between the smooth outer surface of the inner end section and the hole than is the case where only the teeth engage the hole. Thus the smooth surface gives the high holding power which is desirable.

Another significant distinction between the anchor of this invention and, consequently, a feature of this invention over the prior art, is that the joining portion, while it is thin, is nonetheless continuous rather than being a series of separated connecting members. It was found that the devices such as illustrated in the patents often were faulty in operation since, in normal handling and use, the nut portion broke away from the shell portion prior to use. Furthermore, and more importantly, the very nature of the separated connecting pieces resulted in a difficult operation when the nut was tapped after the unit was cast. Inasmuch as the nut must be tapped in order for the unit to be useful and such tapping cannot efficiently be a part of the casting operation, the weakness of the connecting pieces was a serious disadvantage during the tapping step.

The just mentioned disadvantage of prior art anchors is successfully overcome in the device of this invention by making the joining portion continuous so that when the nut is tapped the joining portion will have sufficient strength to withstand the tapping operation and to permit a substantial increase in the torque allowable during the tapping operation. Another advantage of having the joining portion be continuous in that it keeps the internal portions of the anchor cleaner and prevents the entry of foreign matter into the threads.

Another distinct difference and advantage of the device of this invention is the provision of an annular depth indicating ring on the head section of the shell portion. This ring permits the anchor to be used as a gauge and thereby provides an accurate measure of the drilled depth of the hole in which the anchor is to be inserted. The depth is such that the optimum expansion will result when the anchor has been properly installed. External ribs are provided on the head section which terminate on the just mentioned indicating ring. These ribs perform the function of preventing the shell portion from turning in the hole. The fact that the ribs terminate on the hole depth indicating ring permits the anchor to be inserted deeper into the installation hole without any interference from the rotation preventing ribs. Furthermore, the external ribs permit the anchor to be driven further into an extra deep hole and thus give added holding power to the anchor as such. This latter feature is important when the strength of the masonry is questionable.

Another feature of the anchor of this invention is that the entire structure has been strengthened in various areas where prior art devices are known to be weak. For example, in the devices of the patents, the taper on the nut portion extends to its very end. Thus the inner end of the nut portion has a sharp edge, which sharp edge is known to get broken or chipped off as the nut is drawn in the shell portion, causing a material decrease in holding power. This fault is overcome in the anchor of the invention by making the taper steeper and by providing a cylindrical section at the end. This strengthens the nut to the point where the anchor of this invention has as much as two or three times the holding power of prior art anchors.

Another distinct feature of this invention is that the largest diameter of the nut portion is substantially less than the diameter of the body section of the shell portion. In the devices illustrated in the above mentioned patents, the nut portion's largest diameter is the same as the body section of the shell portion. This prevents the devices of the above mentioned patents from being inserted into the tapered hole which often results from worn drills. Furthermore, the attempted insertion of the devices illustrated and described in the above mentioned patents into the tapered hole results in the breaking away of the nut portion prior to the time the nut portion reaches the bottom of the hole and creates an expansion of the inner end section prior to the time that it should occur. By providing in the device of this invention a nut portion having smaller diameter than the shell portion both of these disadvantages of the prior art anchors are overcome.

While the device of this invention can be made from any suitable material, it is preferred that the material be a zinc alloy. Such a material is corrosion-resistant and thereby eliminates plating and coating operations which are necessary in other types of materials which have been used in prior art devices. Furthermore, zinc alloys are substantially less brittle than are the materials which have previously been used. Another distinct advantage is that the casting costs of zinc alloys are substantially lower than the cost of preparing sand casting of malleable iron which is the common material which has previously been used. It was found that in such devices as are illustrated and described in the above mentioned patents, the reject rate was approximately 50% whereas these zinc alloy castings of this invention have practically no reject rate. A further substantial advantage of the preferred material used to manufacture the anchors of this invention is that no heat treatment is necessary. A heat treatment was previously necessary for malleable iron and other materials which were employed in the prior art which resulted in warpage and thus produced useless anchors.

Another advantage and feature of this invention is that the device can be readily die cast as opposed to sand casting. Die casting has the distinct feature of permitting a very low cost manufacturing operation, while at the same time obtaining much more accurate and uniform products. Much thinner sections are obtainable where they are needed and the operation is substantially faster. In the die casting method of manufacture, a plurality of items can be produced at once which when subjected to a tumbling break-off operation permits the separate anchors to be easily broken away from their gate and thus eliminates the trimming and grinding operations which were found necessary in manufacturing the prior art devices.

Other features and advantages of this invention will become more apparent in the description which follows below when taken in connection with the drawings, which are as follows:

FIG. 1 is an elevation view of the device of this invention;

FIG. 2 is an outer end view of the device illustrated in FIG. 1;

FIG. 3 is an inner end view of the device illustrated in FIG. 1;

FIG. 4 is an enlarged cross-sectional elevation view of the device illustrated in FIG. 1 taken on the line 4—4 of FIG. 2;

FIG. 5 is a cross-sectional end view of the device illustrated in FIG. 1 taken on the line 5—5 of FIG. 1;

FIG. 6 is a partial cross-sectional end view of the device shown in FIG. 1 taken on the line 6—6 of FIG. 1;

FIG. 7 is a partial cross-sectional end view of the device illustrated in FIG. 1 taken on the line 7—7 of FIG. 1;

FIG. 8 is an enlarged view similar to FIG. 4 illustrating the positioning of the device of this invention in a drilled hole prior to expansion;

FIG. 9 is a view similar to FIG. 8 but showing the device of this invention after expansion;

FIG. 10 is a view similar to FIG. 9 which also shows a member attached to the structure in which the hole has been drilled by means of a bolt;

FIG. 11 is a view similar to FIG. 10 except that it is not a cross-sectional view;

FIG. 12 is a cross-sectional end view of the device illustrated in FIG. 11 taken on the line 12—12 of FIG. 11; and FIG. 13 is a view similar to FIG. 1 illustrating a modification thereof.

Referring now to FIGS. 1–7, it will be seen that the anchor 18 of this invention is made up of three principal portions 20, 22 and 24. Those portions are the shell portion 20, a tapered nut portion 22 and a thin continuous joining portion 24. In the discussion below, the separate portions will be referred to first, and then a thorough discussion of the functioning of the various portions 20, 22, 24 will be given.

Considering first the shell portion 20, it will be seen from the figures that the shell portion 20 has three distinct sections 26, 28, 30 having a substantially cylindrical bore 31 formed therethrough. It will be appreciated that, for diecasting core pin removal purposes, some slight taper may be required. Thus "substantially cylindrical bore" is intended to include such a form.

The thickness of the inner end section 26 progressively decreases from the point on the shell portion 20 at which it begins until it terminates at the joining portion 24. The body section 28 is subtantially cylindrical and its diameter is determined by the size hole into which the anchor 18 of this invention is to be inserted. The thickness of the body section 28 is substantially constant throughout its length.

The head section 30 also is substantially cylindrical except for an outer lip portion 32 which is substantially thicker than the body section 28. This thicker lip portion 32 gives greater body and hence greater strength to the head section 30 so that it can withstand the installation forces which are applied in order to position the outer end surface 29 of head section 30 flush with the outside of the hole 36.

A slightly raised annular indicating ring 34 is provided. The purpose of the ring 34 is to give an indication of the depth to which the hole 36, into which the anchor 18 is to be inserted, should be drilled. Thus, when the body section 28, inner end section 26 and the tapered nut section 22 are inserted into a hole in the manner illustrated in FIG. 8 only the head section 30 will be positioned outside the hole. This feature permits the person installing the anchor 18 to accurately gauge the depth to which the hole 36 should be drilled. Furthermore, since the ring 34 extends out from the body section 28, it will normally engage the outer end of the hole.

The location of indicating ring 34 is determined by the thickness of the material used throughout the anchor, the tapers on both the inner end section 26 and nut portion 22, as well as the length of nut portion 22. These factors are taken into account so that when the nut 22 has moved the distance between the ring 34 and the outer end surface 29 into bore 31 the optimum expansion of inner end section 26 will have occurred.

There is also provided a plurality of externally formed anti-turning ribs 38 on the head section 30. The ribs 38 perform the function of preventing the anchor 18 from rotating when the bolt 40, such as is illustrated in FIGS. 10 and 11, is tightened within the anchor 18.

A plurality of grooves 42 are formed within the cylindrical bore 31. As illustrated in the figures, the grooves 42 extend from the outer end of the head section 30 completely through the shell portion 20 and terminate part of the way through the joining portion 24. However, the grooves 42 need not necessarily be formed in either the head section 30 or the body section 28 but should always be formed in the inner end section 26 of the shell portion 20. However, for ease of manufacture in the die-casting method described below, the grooves 42 are usually formed as is illustrated. It will be noted that the external ribs 38 formed on the head section 30 are directly opposite the grooves 42. This materially strengthens the head section 30 so that it can much better withstand the driving forces which are normally used in forcing the nut portion 22 to expand the inner end section 26.

As is illustrated in FIG. 13, the inner end section may have teeth 44 formed thereon, if desired. While annular teeth 44 are illustrated, the teeth may be of any suitable form such as ribs of the same general form as that illustrated for the ring 34, or may simply be serrations. The purpose of teeth 44 or other equivalent is to permit after expansion, the inner end section to dig into uneven or rough sections of a drilled hole 36.

The smaller end 46 of the tapered nut portion 22 is joined to the shell portion 20 by means of the thin continuous joining portion 24. The diameter of the inner end section 48 of the nut portion 22 is slightly less than the diameter of the body section 28 of the shell portion 20. This latter feature permits the anchor 18 to be inserted into a tapered hole, which often results from worn drills or from careless drilling, without any force being exerted on the nut portion 22 which would be sufficient to break through the thin continuous joining portion 24.

As has been pointed out above in discussing the features of the device of this invention, the nut portion 22 has inner end section 48 which is cylindrical in cross section rather than being tapered all the way to its inner end. The taper of the nut portion 22 is relatively steep when compared to prior art devices. While the cylindrical cross-sectional shape to inner end section 48 is not always required (see the modification illustrated in FIG. 13 for example), it has been found that, by adding to the strength of the inner end section 48, the holding power of anchor 18 is increased by a factor of more than 25% and in certain tests as much as 100%. Thus this seemingly small difference over the devices illustrated in the prior art patents mentioned above gives truly extraordinary and surprisingly great increases in holding power.

As is clearly shown in FIGS. 3, 8, 9 and 10, the nut portion 22 is tapped in order to receive the bolt 40 illustrated in FIG. 10. The threads 50 extend through and are cut into the joining portion 24 so that the bolt 40 will be led into the nut portion 22 easily.

Externally formed ribs 52 are provided on nut portion 22. The position of ribs 52 corresponds to the position of grooves 42. It will be noted that, as illustrated, the portion of the ribs 52 which is joined to the joining portion 24 is substantially wider than the remaining part of ribs 52. This feature together with the fact that the joining portion 24 is continuous permits the anchor 18 to be subjected to a substantially greater amount of torque during the tapping operation which provides thread 50 in nut portion 22. It should be further noted that the thickness of the end of nut portion 22 which is joined to the joining portion 24 is substantial so that when nut portion 22 breaks through the joining portion 24, there will be no danger that the portion of threads 50 which will be within bore 31 will become damaged during the breaking through process.

The joining portion 24 performs the functions described above. As has been previously mentioned, grooves 42 extend into and terminate in joining portion 24. Thus, in all parts of the joining portion 24, other than the areas into which the grooves 42 extend, the joining portion is of substantial thickness. With respect to those portions into which the grooves 42 do extend, the wide ends of ribs 52 provide added strength at these points. Thus the joining portion 24 has sufficient strength to permit the necessary tapping operation to provide threads 50 and also permits the rough treatment to which the anchor 18 is subjected after being die-cast as described below during the tumbling break-off step.

However, the thinnest parts of joining portion 24 occur at the very points where they are needed in order to insure that ribs 52 enter grooves 42 when nut portion 22 is broken through as described below.

FIGS. 8–12 illustrate the anchor 18 of this invention in use. As has been previously indicated a hole 36 is drilled into some structural member 54. The proper depth of the hole is indicated by the position of ring 34 and FIG. 8 illustrates the proper positioning of the anchor 18 after the hole 36 has been drilled. In order to expand the inner end section 26 into firm contact with the sides of hole 36, the head section 30 may either be driven by means of a hammer into the position illustrated in FIG. 9 or a bolt 40 which passes through some member 56 to be attached to structural member 54 is inserted and the nut portion 22 is drawn into bore 31. In either case, the ribs 52 break through the thinnest part of joining portion 24 and enter into grooves 42. This causes the inner end section 26 to split along the lines as illustrated at 56 in FIGS. 9, 10, 11 and 12. Simultaneously, all portions of the inner end section 26 are forced into firm contact with the sides of hole 36. As illustrated in FIG. 9, the head section 30 is driven into hole 36 sufficiently far that it is flush with the outside of structural member 54. In the case of causing the expansion of inner end section 26 by means of bolt 40, the head section 30 is forced into hole 36 and the nut portion 22 is drawn sufficiently far into bore 31 to cause expansion of the inner end section 26 far enough to thoroughly engage the sides of hole 36.

It should be noted that if the anchor 18 when being inserted into a hollow structural member is such that the nut portion 22 cannot be driven into bore 31 by forcing it against the bottom of hole 36, the nut portion 22 will necessarily have to be drawn into bore 31 by bolt 40.

It should also be noted that the ribs 38 taper slightly upward towards the outer end surface 29 and extend out from the center of the anchor 18 farther than the body section 28, and consequently said ribs 38 will dig into the sides of the hole 36 and thus prevent rotation of the anchor 18 as the bolt 40 is tightened. Of course, once the expansion of the inner end section 26 is complete, the friction created thereby will be sufficient to hold the anchor 18 firmly in place. However, in deep holes, ribs 38 provide additional holding power which is necessary in instances where the masonry is of doubtful strength. Also if the hole 36 is oversize in diameter or if the material comprising the wall compresses substantially, ribs 38 hold the shell against rotation until bolt 40 draws up enough to produce maximum expansion.

As has been previously mentioned above, the anchor 18 of this invention can be made from any suitable material. However, it is preferred that it be formed from a zinc alloy material. Such a material is corrosion resistant and is easily die-cast. Furthermore, if desired, the anchor may be dipped in order to color code or otherwise identify it. Zinc alloys are considerably less brittle than ferritic material, thus permitting a more uniform expansion and greater holding power while sacrificing very little in compressive or expansive strength.

In manufacture, the anchor 18 of the invention can be cast in any manner, but it is preferred that it be die-cast since die-casting is inexpensive and provides much more accuracy and uniform casting than are available otherwise. In addition, the thin sections, such as inner parts of inner end section 26, can be more easily formed with greater accuracy. Also die-casting is faster than other methods. Tumble break-off of a plurality cast as just described eliminates the trimming and grinding operations which have been necessary in devices produced by other methods of casting.

While specific embodiments have been illustrated and described, it will be apparent to those skilled in the art that modifications can be made without departing from the scope of the annexed claims.

What is claimed:

1. A bolt anchor comprising a shell portion having a substantially cylindrical internal bore with a substantially constant inside diameter, said shell portion including an inner end section whose outside diameter progressively decreases towards its inner end, a head section, and a body section disposed between said head section and said inner end section, said head section having a greater outside diameter than said body section; a tapered nut portion having a smaller end with a diameter slightly smaller than the diameter of said bore adjacent thereto and a substantially cylindrical larger end portion with a diameter slightly less than the outside diameter of said body section of said shell portion, said smaller end extending into said bore in said inner end section; a thin continuous annular joining portion disposed within said inner end section adjacent said inner end and joining the smaller end of said nut portion to said inner end section, said shell portion having internal groove means formed in at least said inner end section thereof and terminating in said joining portion, the depth of said groove means being less than the thickness of the portion of said shell portion in which it is formed; and external rib means formed on the tapering part of said nut portion in a position corresponding to said groove means.

2. A one-piece bolt anchor comprising a shell portion having an inner end section, a head section, and a body section disposed therebetween, said head section having a greater outside diameter than said body section and having an outer end section whose outside diameter is substantially greater than the outside diameter of said body section, said shell portion having a substantially cylindrical internal bore extending therethrough; a tapered nut portion whose smaller end is of slightly less diameter than the diameter of said bore, said smaller end extending into the portion of said bore adjacent said inner end; a thin continuous annular joining portion disposed within the portion of said inner end section adjacent said inner end and joining said smaller end of said nut portion to said shell portion, said shell portion having internal groove means extending therethrough and terminating in said joining portion, the depth of said groove means being less than the thickness of the portion of said shell portion in which said groove means is formed, external rib means formed on said nut portion, and additional external rib means formed on said head section of said shell portion, said rib means and said additional rib means being disposed in a position corresponding to said groove means, and a raised annular location ring positioned on said shell portion at a predetermined distance from the free end of said head section opposite said body section which is a fraction of the length of said nut portion, said predetermined distance being substantially equal to the travel of said nut portion with respect to said inner end section when said anchor is installed in a hole, whereby the distance from said location ring to the larger end of said nut portion can indicate the proper depth of a hole for receiving said anchor.

3. A one-piece bolt anchor comprising a shell portion having a head section, a body section, and an inner end section, said inner end section having a plurality of annular teeth formed thereon, all of said sections having a substantially cylindrical bore formed therethrough; a tapered nut portion whose largest outside diameter is slightly less than the mean outside diameter of said shell portion and whose smaller end has an outside diameter slightly less than the inside diameter of said bore, said smaller end extending into the portion of said bore adjacent to said inner end; a thin continuous annular joining portion disposed within the portion of said inner end section adjacent said inner end and joining the smaller end of said nut portion to the innermost end of the said shell portion, said shell portion having a plurality of internal grooves formed therethrough which extend in depth part of the way through the portion of said shell portion in which they are formed and terminate in said joining portion, and a plurality of longitudinally extending external ribs formed on said head section and said nut portion, said external rib on said nut portion being in positions corresponding to said grooves, said ribs on said head section extending outwardly therefrom a distance sufficient to engage the sides of a hole into which said anchor is inserted, said ribs on said nut portion being substantially wedge-shaped and decreasing in radial thickness and decreasing in height relative to the outer surface of said nut portion in the direction of the larger end of said nut portion, the greatest circumferential width of said ribs on said nut portion being adjacent said joining portion.

References Cited by the Examiner

UNITED STATES PATENTS

| | | | |
|---|---|---|---|
| 683,082 | 9/01 | Summerer | 85—67 |
| 1,182,015 | 5/16 | Kennedy | 85—72 |
| 1,469,667 | 10/23 | Pleister | 85—72 |
| 1,808,318 | 6/31 | Pleister | 85—72 |
| 2,102,230 | 12/37 | Waterman | 85—72 |
| 2,120,577 | 6/38 | Schulte | 85—75 |
| 3,089,377 | 5/63 | Engstrom | 85—72 |

FOREIGN PATENTS

| | | |
|---|---|---|
| 505,145 | 4/20 | France. |
| 647,380 | 12/50 | Great Britain. |

CARL W. TOMLIN, *Primary Examiner.*

EDWARD C. ALLEN, *Examiner.*